United States Patent [19]

Sanders

[11] 4,264,365

[45] Apr. 28, 1981

[54] PRODUCTION OF PRESSURE-SENSITIVE CARBONLESS RECORD SHEETS USING DIOIC ACID HOT MELT SYSTEMS AND PRODUCTS THEREOF

[75] Inventor: Frederick W. Sanders, Chillicothe, Ohio

[73] Assignee: The Mead Corporation, Dayton, Ohio

[21] Appl. No.: 80,811

[22] Filed: Oct. 1, 1979

Related U.S. Application Data

[60] Division of Ser. No. 11,964, Feb. 14, 1979, Pat. No. 4,203,619, which is a continuation-in-part of Ser. No. 869,995, Jan. 17, 1978, abandoned.

[51] Int. Cl.[3] .......... C09D 11/00

[52] U.S. Cl. .......... 106/21; 106/27; 282/27.5; 427/150; 428/488

[58] Field of Search .......... 106/14.5, 21, 27, 28, 106/31; 282/27.5; 427/150, 151, 152, 153; 428/307, 411, 488, 537, 913, 914

[56] References Cited

U.S. PATENT DOCUMENTS

| | | | |
|---|---|---|---|
| 3,016,308 | 1/1962 | Macaulay | 428/327 |
| 4,025,090 | 5/1977 | Petitpierre | 428/411 |

*Primary Examiner*—Hosea E. Taylor

*Assistant Examiner*—Amelia B. Yarbrough

*Attorney, Agent, or Firm*—Stephen H. Cagle; Charles N. Shane, Jr.; W. G. Palmer

[57] ABSTRACT

A process is provided for producing a pressure-sensitive carbonless record sheet comprising the steps of preparing a hot melt coating composition, the hot melt coating composition having a melting point of from about 60° C. to about 140° C. The hot melt coating composition comprises a chromogenic material and a solid alkane dioic acid. The hot melt coating composition is heated to a temperature above its melting point and the heated coating composition is applied to a substrate, the coating composition being applied at a coat weight of from about 0.2 pounds to about 8.0 pounds per 3300 square feet of substrate. The coating composition is set by cooling the coated substrate. A pressure-sensitive carbonless record sheet comprising a substrate having a plurality of surfaces and at least one surface of which is coated with about 0.2 pounds to about 8 pounds per 3300 square feet of a set hot melt coating composition is produced. The set hot melt coating composition has a melting point of from about 60° C. to about 140° C. and comprises a chromogenic material and a solid alkane dioic acid. A novel hot melt chromogenic coating composition having a melting point of from about 60° C. to about 140° C. and comprising a chromogenic material and a solid alkane dioic acid is produced.

4 Claims, No Drawings

PRODUCTION OF PRESSURE-SENSITIVE CARBONLESS RECORD SHEETS USING DIOIC ACID HOT MELT SYSTEMS AND PRODUCTS THEREOF

CROSS REFERENCE TO RELATED APPLICATION

This is a division of application Ser. No. 011,964, filed Feb. 14, 1979, now U.S. Pat. No. 4,203,619, issued May 20, 1980 which in turn is a continuation-in-part of commonly assigned, copending application U.S. Ser. No. 869,995 filed Jan. 17, 1978, now abandoned.

BACKGROUND OF THE INVENTION

This invention relates to the production of a pressure-sensitive carbonless record sheet utilizing a hot melt system to form a coating composition containing a chromogenic material, which coating is set by cooling. More particularly, it relates to production of a record sheet using a novel coating composition comprising chromogenic materials and solid alkane dioic acids. For purposes of this application the term "chromogenic" shall be understood to refer to materials such as color developers, color precursors and color formers. Additionally, the term "CF" shall be understood to refer to a coating normally used on a record sheet and the term "CB" shall be understood to refer to a coating normally used on a transfer sheet.

Carbonless paper, briefly stated, is a standard type of paper wherein during manufacture the backside of a paper substrate is coated with what is referred to as a CB coating, the CB coating containing chromogenic material, generally one or more color precursors dissolved in a carrier oil and generally in capsular form. At the same time the front side of the paper substrate is coated during manufacture with what is referred to as a CF coating, which contains one or more color developers. Both the color precursor and the color developer remain in the coating compositions on the respective back and front surfaces of the paper in colorless form. This is true until the CB and CF coatings of adjacent sheets are brought into abutting relationship and sufficient pressure, as by a typewriter, is applied to rupture the CB coating to release the color precursor. At this time the color precursor contacts the CF coating and reacts with the color developer therein to form an image. Carbonless paper has proved to be an exceptionally valuable image transfer medium for a variety of reasons only one of which is the fact that until a CB coating is placed next to a CF coating both the CB and the CF are in an inactive state as the co-reactive elements are not in contact with one another. Patents relating to carbonless paper products are:

U.S. Pat. No. 2,712,507 (1955) to Green
U.S. Pat. No. 2,730,456 (1956) to Green et al
U.S. Pat. No. 3,455,721 (1969) to Phillips et al
U.S. Pat. No. 3,466,184 (1969) to Bowler et al
U.S. Pat. No. 3,672,935 (1972) to Miller et al A third generation product which is in an advanced stage of development and commercialization at this time and which is available in some business sectors is referred to as self-contained paper. Very generally stated self-contained paper refers to an imaging system wherein only one side of the paper needs to be coated and the one coating contains both the color precursor, generally in encapsulated form, and the color developer. Thus when pressure is applied, again as by a typewriter or other writing instrument, the color precursor capsule is ruptured and reacts with the surrounding color developer to form an image. Both the carbonless paper image transfer system and the self-contained system have been the subject of a great deal of patent activity. A typical autogeneous record material system, earlier sometimes referred to as "self-contained" because all elements for making a mark are in a single sheet, is disclosed in U.S. Pat. No. 2,730,457 (1956) to Green.

A disadvantage of coated paper products such as carbonless and self-contained stems from the necessity of applying a liquid coating composition containing the color forming ingredients during the manufacturing process. In the application of such coating, volatile solvents are sometimes used which then in turn requires evaporation of excess solvent to dry the coating thus producing volatile solvent vapors. An alternate method of coating involves the application of the color forming ingredients in an aqueous slurry, again requiring removal of excess water by drying. Both methods suffer from serious disadvantages. In particular the solvent coating method necessarily involves the production of generally volatile solvent vapors creating both a health and a fire hazard in the surrounding environment. In addition, when using an aqueous solvent system the water must be evaporated which involves the expenditure of significant amounts of energy. Further, the necessity of a drying step requires the use of complex and expensive apparatus to continuously dry a substrate which has been coated with an aqueous coating compound. A separate but related problem involves the disposal of polluted water resulting from the preparation and clean up of the aqueous coating compositions. The application of heat not only is expensive, making the total product manufacturing operation less cost effective, but also is potentially damaging to the color forming ingredients which are generally coated onto the paper substrate during manufacture. The problems encountered in the actual coating step are generally attributable to the necessity for a heated drying step following the coating operation.

Many of the particular advantages of the process and product of this invention are derived from the fact that a hot melt coating composition is used to coat the paper substrate. This is in contrast to the coatings used by the prior art which have generally required an aqueous or solvent coating. For purposes of this application the term "100% solids coating" will sometimes be used to describe the coating operation and should be understood to refer to the fact that a hot melt coating composition is used and, therefore, the drying step normally present in the manufacture of paper and in coating has been eliminated.

In this regard, it should be noted that spot application of aqueous and solvent systems has been known. See, for example, Vassiliades (U.S. Pat. No. 3,914,511) and Miller et al. (U.S. Pat. No. 3,672,935). Macaulay (U.S. Pat. No. 3,016,308), Staneslow et. al. (U.S. Pat. No. 3,079,351) and Shank (U.S. Pat. No. 3,684,549) also disclose hot melt coatings. But to the best of our knowledge none of these hot melt coatings are CF coatings nor are they particularly effective as CB coatings.

The use of alkene dioic acids, i.e. maleic acid and citraconic acid, are disclosed by Petitpierre (U.S. Pat. No. 4,025,090) in the carbonless copy paper environment. These alkene dioic acids have been shown to lack utility in the instant process and product.

The use of water insoluble hot melt coating compositions comprising 15% to 100% of a water insoluble meltable color developer in the preparation of record (CF) sheets is disclosed in commonly assigned U.S. Pat. No. 4,053,754.

By using a combination of solid alkane dioic acids and color developer, as in the instant invention, the amount of color developer needed in the coating is markedly reduced to as low as 0.1% by weight of the CF coating without noticeable loss in color developing power. These CF coatings can be spot printed or coated. Other advantages over the known prior art include sharpness of melting point of the coating composition and ability to accept water base inks, such as script inks and ball point pen inks, and pencil images without image spreading or skipping. This, combined with low viscosity and low tack on cooling to a temperature at which the melt sets, produces a hot melt composition characterized by being printable or coatable on high or low speed equipment without cottoning, stringing, or offsetting or over penetration of the paper. Paper coated with the solid alkane dioic acid compositions is more easily pulped than with, for example, paraffin or synthetic waxes.

The most preferred embodiment of this invention relates to a process for the continuous production of manifold carbonless forms and more particularly to a process for utilizing solid dioic acid hot melt systems containing dispersed color developing material in this continuous production.

As can be appreciated from the above the continuous production of a manifold paper product would require simultaneous coating, simultaneous drying, simultaneous printing and simultaneous collating and finishing of a plurality of paper substrates. Thus, Busch in Canadian Pat. No. 945,443 indicates that in order to do so there should be a minimum wetting of the paper web by water during application of an emulsion coat. For that purpose a high solids content emulsion is used and special driers are described in Busch. However, because of the complexities of the drying step, this process has not been commercially possible to date. More particularly, the drying step involving evaporation and/or water evaporation and the input of heat does not permit the simultaneous or continuous manufacture of manifold forms. In addition to the drying step which prevents continuous manifold form production the necessity for the application of heat for solvent evaporation is a serious disadvantage since aqueous and other liquid coatings require that special grades of generally more expensive paper be employed and even these often result in buckling, distortion or warping of the paper since water and other liquids tend to strike through or penetrate the paper substrate. Additionally, aqueous coatings and some solvent coatings are generally not suitable for spot application or application to limited areas of one side of a sheet of paper. They are generally suitable only for application to the entire surface area of a sheet to produce a continuous coating.

Another problem which has been commonly encountered in attempts to continuously manufacture manifold forms has been the fact that a paper manufacturer must design paper from a strength and durability standpoint to be adequate for use in a variety of printing and finishing machines. This requires a paper manufacturer to evaluate the coating apparatus of the forms manufacturers he supplies in order that the paper can be designed to accomodate the apparatus and process exhibiting the most demanding conditions. Because of this, a higher long wood fiber to short wood fiber ratio must be used by the paper manufacturer than is necessary for most coating, printing or finishing machines in order to achieve a proper high level of strength in his finished paper product. This makes the final sheet product more expensive as the long fiber is generally more expensive than a short fiber. In essence, the separation of paper manufacturer from forms manufacturer, which is now common, requires that the paper manufacturer overdesign his final product for a variety of machines, instead of specifically designing the paper product for known machine conditions.

By combining the manufacturing, printing and finishing operations into a single on-line system a number of advantages are achieved. First, the paper can be made using groundwood and a lower long fiber to short fiber ratio as was developed supra. This is a cost and potentially a quality improvement in the final paper product. A second advantage which can be derived from a combination of manufacturing, printing and finishing is that waste or re-cycled paper, hereinafter sometimes referred to as "broke", can be used in the manufacture of the paper since the quality of the paper is not of an overdesigned high standard. Third, and most important, several steps in the normal process of the manufacture of forms can be completely eliminated. Specifically, drying steps can be eliminated by using a non-aqueous, solvent-free coating system and in addition the warehousing and shipping steps can be avoided thus resulting in a more cost efficient product.

Additionally, by using appropriate coating methods, namely hot melt coating compositions and methods, and by combining the necessary manufacturing and printing steps, spot printing and spot coating can be realized. Both of these represent a significant cost savings, but nevertheless, one which is not generally available when aqueous or solvent coatings are used or where the manufacture, printing and finishing of paper are performed as separate functions. An additional advantage of the use of hot melt coating compositions and the combination of paper manufacturer, printer and finisher is that when the option of printing followed by coating is available significant cost advantages occur.

STATEMENT OF THE INVENTION

A process is provided for producing a pressure-sensitive carbonless record sheet comprising the steps of preparing a hot melt coating composition, the hot melt coating composition having a melting point of from about 60° C. to about 140° C. The hot melt coating composition comprises a chromogenic material and a solid alkane dioic acid. The hot melt coating composition is heated to a temperature above its melting point and the heated coating composition is applied to a substrate, the coating composition being applied at a coat weight of from about 0.2 pounds to about 8.0 pounds per 3300 square feet of substrate. The coating composition is set by cooling the coated substrate. A pressure-sensitive carbonless record sheet comprising a substrate having a plurality of surfaces and at least one surface of which is coated with about 0.2 pounds to about 8 pounds per 3300 square feet of a set hot melt coating composition is produced. The set hot melt coating composition has a melting point of from about 60° C. to about 140° C. and comprises a chromogenic material and a solid alkane dioic acid. A novel hot melt chromogenic coating composition having a melting point of from about 60° C. to about 140° C. and comprising a chromogenic material and a solid alkane dioic acid is produced.

DETAILED DESCRIPTION OF THE INVENTION

The chromogenic hot melt coating composition of this invention is essentially a combination of one or more solid aliphatic dioic acids with one or more chromogenic materials. The dioic acid acts as a hot melt binder in these compositions. Also, it acts to control the melt viscosity, lower the tack, narrow the melting range and reduce the friability of the chromogenic materials. The chromogenic materials and dioic acids are preferably miscible or partially miscible with each other in their molten form so that separation of the components of the composition substantially does not occur during application and setting of the chromogenic hot melt composition.

Other materials may be added, if desired, to the chromogenic coating composition to modify the melting point or other rheological properties or to modify its color or its color producing or physical properties. The use of volatile solvents, including organic solvents and water, in amounts large enough to require a separate step for drying during setting of the hot melt composition must be avoided. Minor amounts of these solvents can be tolerated, and in some cases may be even beneficial. For example, a small amount of water, up to about 5% by weight based on the total weight of the coating composition, will act as a plasticizer and rheology modifying material without requiring drying during the setting step.

A preferred use of the chromogenic coating compositions of this invention is in the preparation of pressure-sensitive carbonless record sheets. Such papers can be used in manifold copy systems in combination with pressure-sensitive transfer sheets containing oil solutions of color precursors of the electron donor type. A preferred group of electron donor color precursors include the lactone phthalides, such as crystal violet lactone, and 3,3-bis-(1′-ethyl-2-methylindol-3″-yl) phthalide, the lactone fluorans, such as 2-dibenzylamino-6-diethylaminofluoran and 6-diethylamino-1, 3-dimethylfluorans, the lactone xanthenes, the leucoauramines, the 2-(omega substituted vinylene)-3,3-disubstituted-3-H-indoles and 1,3,3-trialkylindolinospirans.

The dioic acids useful in the practice of this invention are the alkane dicarboxylic (dioic) acids having a carbon chain of at least 5 carbon atoms. The two end carbons of the carbon chains each form carboxyl groups. These acids have a relatively sharp melting point and have a low stable viscosity when in the molten state. The molten acids are miscible with the preferred phenolic developers and do not separate into the two components upon setting to a solid tack-free film. These acids are stable and do not substantially decompose or volatilize at temperatures encountered in hot melt printing or coating operations. Thus, the coating compositions of this invention are stable and the applied coatings do not sublime on ageing of the final coated product. These dioic acids are soluble or slightly soluble in cold water but are soluble or very soluble in hot water.

The alkane dioic acids having less than 5 carbon atoms in the carbon chain, i.e., succinic, malonic and oxalic acids and alkene dioic acids such as maleic and citraconic acids are not suitable for use as a hot melt binder for color developing compositions as these acids are not stable to heat and ageing or are otherwise unsatisfactory for this purpose. Malonic, succinic and maleic, and oxalic acids on heating on near or slightly above their melting point tend to decompose and evaporate and give off acidic fumes which are toxic and damaging to coating equipment. Succinic acid forms a gritty substance when melted with a phenolic developer. Further maleic acid separated from the developers into two phases in the molten stage.

The preferred alkane dioic acids are those having a carbon chain of about 5 to about 10 carbon atoms. Dioic acids having above 10 carbon atoms may be used if desired. However, they are generally more costly and not readily commercially available. The preferred range of dioic acid is from about 50% to about 99.9%, by weight, of the coating composition. The preferred dioic acids are as follows:

| Name of Acid | Carbons in Chain | Approximate Melting Point °C. |
|---|---|---|
| Glutaric Acid | 5 | 99 |
| Adipic Acid | 6 | 151 |
| Pimelic Acid | 7 | 106 |
| Suberic Acid | 8 | 140 |
| Azelaic Acid | 9 | 107 |
| Sebacic Acid | 10 | 135 |

All of the above preferred acids are commercially available. For example, azelaic acid is available under the trade name "Emerox" from Emery Industries, Cincinnati, Ohio.

A particular advantage of the use of the dioic acids as the hot melt binder over the water insoluble hydrophobic waxes of the prior art, such as the hydrocarbon (paraffin) waxes, is that these acids are relatively polar. This permits the use of chromogenic materials, particularly color developers, which are more polar in character than those previously used. Examples of such developers are phenolphthalein, certain metal salts and gallic acid. These polar color developers are at least partially miscible with the molten dioic acids and thus form a homogenous blend of the melted developer and dioic acid. In contrast to this, hydrophobic waxes, such as paraffin are not miscible in the melted condition with the polar color developers and thus do not form homogenous blends with the polar color developers.

The solid alkane dioic acids of this invention are not reactive with electron-donor types of color precursors and thus have not been found to produce color in the absence of the chromogenic material of this invention.

Oil solutions of electron-donor type color precursors produce little or no color formation with these alkane dioic acids. Furthermore, the presence of these acids in the hot melt composition does not interfere with the reaction of the color precursor and chromogenic material (developer) to form a color.

The chromogenic materials most useful are the color developers of the acidic electron-acceptor types. These developers include but are not limited to phenolic materials as other electron-acceptor types such as certain organic metal compounds and colloidal silica and acid clays have been found to be useful. Metal compounds which have been found to be acceptable are zinc thiocyanate, zinc p-toluenesulfonic acid and zinc ammonium thiocyanate.

The preferred color developers are the phenolic compounds, novolak resins and their zincated compounds and resins. The phenolic compounds are solid at normal room temperature. The novolak resins are stringy viscons molasses-like materials in the molten state. These preferred color developers include phenolphthalein, salicylic acid, 3,5-di-tert-butyl salicylic acid, ammonium 5,5-methylene disalicylic acid, salicylsalicylic acid, 1-hydroxy-2-naphthoic acid, resorcinol, gallic acid, methyl gallate, ethyl gallate, propyl gallate, 2-ethylhexyl gallate, tert-butyl phenol, p-phenylphenol, p-octylphenol, Bisphenol A, sulfonyl diphenol, p-phenylphenol novolak resin, p-octylphenol novolak resin (4% zinc), zincated p-phenylphenol novolak resin (4% zinc), zinc salicylate, the zinc salt of 3,5-di-tert-butyl salicylic acid and mixtures thereof. A preferred combination of phenolic compounds or resins with zinc salts of organic acids, such as zinc thiocyanate produced intense blue images.

The preferred range of chromogenic material in the coating composition is from about 0.1% to about 50% by weight of the total composition. A most preferred range is from about 2% to about 25%. The optimum amount may vary somewhat depending on the particular chromogenic material used, the dioic acid used, the coat weight desired and the character and amount of any other modifying material which may be added to the coating composition as desired.

The chromogenic material may be supplemented with materials which act as color intensifiers and color stabilizers. These color intensifiers are materials which in themselves produce little or no color in the presence of the electron donor color precursors. However, these same materials have been found to intensify colors produced by the color developers of this invention. Preferred color intensifiers are ammonium thiocyanate, aluminum oxide and zinc compounds such as zinc oxide, zinc chloride, zinc nitrate, zinc gallate, zinc stearate, zinc neopentoate and zinc lineoleate.

Minor amounts of materials such as resins, waxes and liquid plasticizers may be added to the coating composition to modify the rheology of the composition and/or characteristics of the set coating. In general, these rheology modifying materials can be non-polar or polar. By polar it is meant that a certain amount of polarity is characteristic of these materials, the polar materials being characterized by the presence of functional groups selected from the group consisting of carboxyl, carbonyl, hydroxyl, ester, amide, amine, heterocyclic groups and combinations thereof. The rheology modifying materials may vary in viscosity from liquids such as water to the low molecular weight polypropylene glycol ethers and esters. Other modifying materials which may be used are polyethylene glycols, polystyrenes, polyesters, polyacrylates, rosin, modified rosins, polyphenyls, fatty acids, fatty acid derivatives, oxazoline waxes, neutral waxes, paraffin waxes microcrystalline waxes and fatty amides. These modifying materials may be present in an amount of from about 0% to about 10% by weight of the hot melt coating composition. The preferred range is from about 0% to about 5% and the most preferred range is from about 0% to about 2% of the coating composition.

A desirable characteristic of the hot melt coating composition of this invention is a melting point of from about 60° C. to about 140° C., although a more preferred melting point for the coating compositions is from about 70° C. to about 100° C. Also relative to the melting point, it is desirable for the coating composition of this invention to set rapidly after application to the particular substrate. More specifically, a practical melting range limitation or in other words range of temperature in which the liquid hot melt coating composition sets into a solid composition, is from about 1° C. to about 15° C. The preferred setting time is from about 0.1 seconds to about 5 seconds while the most preferred setting time is from about 0.1 seconds to about 1 second. While hot melt compositions having a melting range of more than 15° C. can be used, the time necessary for such a coating composition to set firmly to a tack-free state requires special apparatus and handling and makes use of these hot melt compositions commercially unattractive. Due to their sharply defined melting points, the dioic acids of this invention have the particular advantage of keeping the melting range below 15° C.

The preferred hot melt coating composition of this invention have a low viscosity when in a molten state in order to facilitate ease of spreading on the substrate. In general, it is desirable that the hot melt coating composition have a viscosity of less than about 500 centipoises at a temperature of approximately 5° above the melting point of a particular hot melt coating composition. In addition, it is preferred that the hot melt coating composition of this invention have a light color in order to be compatible with the final paper or plastic product being produced. This means that it is preferred for the hot melt to be white or colorless after application to the particular substrate being coated.

Pigment materials can be added to the coating composition as flattening agents to reduce the glossy appearance of the cured hot melt coatings and preserve the appearance of the substrate. Thus a bond paper which has been coated with the coating composition of this invention and which is then cured to a solid gives the impression of being an uncoated bond paper. Typical of the pigments which can be used are diatomaceous earth, calcium carbonate, titanium dioxide, barium sulfate, colloidal alumina, colloidal silica, acid clays and bentonite.

The chromogenic coating composition may be prepared by melting the dioic acid and stirring, grinding or melting in the color developer and other desired materials.

The chromogenic color developing coating composition can be applied hot to a substrate, such as paper or a plastic film by any of the common paper coating processes, such as roll, blade coating or by any of the common printing processes, such as planographic, gravure, or flexographic printing. The rheological properties, particularly the viscosity of the coating composition, can be adjusted for each type of application by proper selection of the type and relative amounts of modifying materials. While the actual amount of the hot melt coating composition applied to the substrate can vary depending on the particular final produce desired, for purposes of coating paper substrates, the practical range of coat weights for the CF chromogenic coating compositions of this invention are from about 0.2 pounds to about 8 pounds per 3300 square feet of substrate, the preferred range being from about 0.2 pounds to about 5 pounds per 3300 square feet of substrate and the most preferred range being from about 0.2 pounds to about 2.5 pounds per 3300 square feet of substrate. Coat weights above the preferred range do not show any substantial improvement over those within the most preferred range.

These hot melt coating compositions can be set by any cooling means. Preferably a chill roll is used on the coating apparatus which cools the hot melt coating immediately after coating, but it is also quite common to simply allow the coating composition to cool naturally by atmospheric exposure. As the temperature of the coating composition is substantially higher than room temperature and in light of the fact that the coating thickness is generally less than 50 microns it can be seen that when spread out over a coated substrate the hot melt material cools very rapidly. The actual exposure or chill time necessary for setting of the chromogenic coating composition is dependent on a number of variables, such as coat weight, the particular color developers and rheology modifying materials used, type of cooling means, temperature of the cooling means, specific substrate being coated and others.

In the preferred application of the process and products of this invention a manifold carbonless form is produced. In this process a continuous web is marked with a pattern on at least one surface. A non-aqueous, solvent free hot melt coating of chromogenic material is applied to at least a portion of at least one surface of the continuous web. The coated surface is then set by cooling. The continuous web having the set coating is then combined with at least one additional continuous web which has been previously or simultaneously coated with a hot melt material and set by cooling. A manifold carbonless form is then made by a variety of collating and finishing steps. Such a process and product are described in commonly assigned, co-pending application Ser. No. 684,460 entitled "Manifold Carbonless Form and Process for the Production Thereof (Custom)" filed on May 7, 1976, now U.S. Pat. No. 4,097,619, and which is incorporated herein by reference.

In the most preferred application of the process and products of this invention a manifold form is continuously produced. In this most preferred embodiment a plurality of continuous webs are advanced at substantially the same speed, the plurality of continuous webs being spaced apart and being advanced in cooperating relationship with one another. At least one web of the plurality of continuous webs is marked with a pattern and at least one non-aqueous, solvent-free hot melt coating containing the chromogenic material is applied to at least a portion of at least one of the plurality of continuous webs. The hot melt material is then set by cooling. The continuous webs are then collated and placed in contiguous relationship to one another to create a manifold form. After the continuous webs are placed in collated, contiguous relationship they can be finished by any combination of the steps of combining, partitioning, stacking, packaging and the like. Such a process and product are described is commonly-assigned, co-pending application Ser. No. 684,461 entitled "Manifold Carbonless Form and Process for the Continuous Production Thereof (Standard)" filed on May 7, 1976, now U.S. Pat. No. 4,112,138, and which is incorporated herein by reference.

The following examples illustrate preferred embodiments but do not limit the scope of the invention which is defined in the claims.

EXAMPLE 1

3 parts of sebacic acid and 1 part of 3,5-di-tert-butyl salicylic acid were melted together and 0.2 part of solid ammonium thiocyanate was ground into the melt using a mortar and pestle to form a hot melt composition. Using a blade heated to about 170° C., the hot melt composition was coated on paper and cooled to produce a coated paper having about 5 pounds of set coating per 3300 square feet of paper.

The set, coated paper was tested by placing the coated surface thereof in contact with the coated side of a CB paper coated with gelatin microcapsules containing a marking oil made up of 180 parts of monoisopropylbiphenyl, 5.3 parts of crystal violet lactone, 0.62 parts of 3,3-bis-(1-ethyl-2-methylindol-3-yl)-phthalide, 1.25 parts of 3-N-N-diethylamino-7-(N,N-dibenzylamino)fluoran, 0.95 parts of 2,3-(-1'-phenyl-3'-methylpyrazolo)-7-diethylamino-4-spirophthalidochromene and 122 parts of odorless kerosene. These sheet couples were imaged with an electric typewriter using a character "m" in a repeating block pattern, and the intensity of color of the images after an elapsed time of 10 minutes was recorded.

An intense blue image was produced on the hot melt coated paper.

EXAMPLE 2

3 parts of sebacic acid and 1 part of 3,5-di-tert-butyl salicylic acid were melted together as in Example 1. To this hot melt was added 0.5 parts of a second hot melt consisting of the following:

72.7 parts urea
7.3 parts polyvinyl pyrolidone
7.3 parts zinc oxide
7.3 parts ammonium thiocyanate
5.3 parts hydantoin The resulting coating composition as coated on paper and the coated paper was pressure imaged as in Example 1. The coat weight was about 3 pounds per 3300 square feet of paper. An intense brilliant blue image was formed.

EXAMPLE 3

Into 8 parts of sebacic acid was ground 0.2 parts of ammonium thiocyanate and 0.1 parts of zinc oxide. The composition was coated on paper and the paper was pressure imaged as in Example 1. An intense violet-blue image was produced.

EXAMPLE 4

Example 3 was repeated additionally adding by grinding in 0.2 parts of urea to the hot melt coating composition. An intense blue image was produced.

EXAMPLES 5 THROUGH 12

A series of hot melt coating compositions were made in which the relative amounts of color developer and dioic acids were varied and different representative dioic acids were used. The color developer was a p-phenylphenol novolak resin. The hot melt compositions were prepared by melting together the ingredients of each composition. The hot melt compositions were coated on paper and the papers were tested as in Example 1. The approximate melting point was determined for each composition by allowing a bead of molten composition to cool on the bulb of a thermometer and recording the temperature at which the bead became solid. The results are in Table 1 which follows:

TABLE I

| Example No. | Composition of Hot Melt: Color Developer[1] | Dioic Acid | Approximate Melting Point °C. | Description of Image |
|---|---|---|---|---|
| 5 | 75 parts | 25 parts azelaic | 55[2] | Intense Blue |
| 6 | 50 parts | 50 parts azelaic | 65[3] | Intense Blue |
| 7 | 25 parts | 75 parts azelaic | 80[4] | Intense Blue |
| 8 | 25 parts | 75 parts glutaric | 86 | Moderate Blue |
| 9 | 25 parts | 75 parts pimelic | 87 | Intense Blue |
| 10 | 25 parts | 64 parts azelaic<br>7 parts pimelic<br>4 parts glutaric | 60 | Moderate Blue |
| 11 | As Example 7 + 15 parts diatomaceous earth - Intense Grey-Blue | | | |

[1]Color developer is p-phenylphenol novolak resin.
[2]Hot melt composition is stiff and sticky at 55° C.
[3]Hot melt composition is too stiff to stir at 65° C.
[4]Hot melt composition is a dry solid with a smooth non-sticky surface.

EXAMPLES 12 THROUGH 25

A series of hot melt coating compositions were made in which the relative amounts of azelaic acid were varied and different developers were used. The hot melt compositions were coated and tested as in Example 1. The results are given in Table II.

TABLE II

| Ex. No. | Composition of Hot Melt | Description of Image |
|---|---|---|
| 12 | 0.1 part phenolphthalein<br>99.9 parts azelaic acid | Moderate Reddish Blue |
| 13 | 0.9 parts salicylic acid<br>99.9 parts azelaic acid | Faint Purple |
| 14 | 1 part ammonium, 5,5'-methylene disalicylic acid<br>99 parts azelaic acid | Pale Blue |
| 15 | 20 parts ammonium, 5,5'-methylene disalicylic acid<br>80 parts azeliac acid | Moderate Blue |
| 16 | 1 part tert-butyl phenol<br>99 parts azelaic acid | Moderate Blue |
| 17 | 10 parts tert-butyl phenol<br>90 parts azelaic acid | Moderate Blue |
| 18 | 5 parts Bisphenol A<br>95 parts azelaic acid | Moderate Purple |
| 19 | 1 part sulfonyl diphenol<br>99 parts azelaic acid | Pale Purple |
| 20 | 10 parts sulfonyl diphenol<br>90 parts azelaic acid | Pale Purple |
| 21 | 1 part gallic acid<br>99 parts azelaic acid | Blue |
| 22 | 20 parts ethylhexyl gallate<br>80 parts azelaic acid | Intense Blue |
| 23 | 5 parts 1-hydroxy, 2-naphthoic acid<br>95 parts azelaic acid | Moderate Purple |
| 24 | 5 parts zincated p-octyl-phenol novolak resin (4% Zn)<br>95 parts azelaic acid | Moderate Blue |
| 25 | 35 parts p-phenylphenol novolak resin<br>65 parts azelaic acid | Intense Blue |

EXAMPLE 26

A hot melt composition was prepared by melting 6 parts of azelaic acid and adding 0.1 part of zinc carbonate, degassing the composition by applying a vacuum (about 25 mm absolute pressure) and adding 0.1 part of potassium thiocyanate and 1 part of p-phenylphenol novolak resin. The hot melt coating composition was coated on paper and the coated paper was tested as in Example 1. Intense bright blue images were formed, which images were resistant to light ageing and water spotting.

EXAMPLE 27

The hot melt composition of Example 7 was printed by means of a gravure offset press as a speed of 500 feet per minute on the obverse side of the CB paper of the type used in the pressure imaging of Example 1. Coat weights ranging from about 1 to about 4 pounds per 3300 square feet of paper were applied. A sheet of the printed paper was pressure imaged as in Example 1 with the printed hot melt side against the CB side of the second sheet. Intense blue images were produced on the printed side of each of the papers tested regardless of coat weight.

EXAMPLE 28

Example 27 was repeated, however, instead of applying the hot melt composition to the obverse side of the CB paper, the hot melt coating was printed on the CB surface of the coated paper to form a self-contained paper. Pressure imaging of the paper with a ribbonless typewriter produced intense blue images.

From Examples 27 and 28 it can be seen that CF coatings of the hot melt type of the instant invention can effectively be printed in fluid hot melt form, set by cooling, and joined with a CB sheet to produce a carbonless copy system which upon application of pressure gives good transfer and a sharp developed image. It is thus possible to utilize the hot melt CF coatings of this invention in the continuous production of manifold carbonless forms,

EXAMPLE 29

50 parts of a commercially available novolak phenol resin (UC 9869 Union Carbide) were melted and heated to 160° C. 50 parts of adipic acid was added and the mixture brought back to 155° C. by heating, at which time the composition was clear and very fluid.

The melting point of the composition was 136° C.

The composition was melted, then coated and tested as in Example 1. An intense blue image was produced on the hot melt coated paper.

The only requirement is that a hot melt coating or printing operation (i.e., one in which the coating is maintained at above melting point of the coating) is followed by a cooling step to set the resulting coating. As mentioned such a system is much less expensive and cumbersome, requires less floor space and requires less energy than systems which requires expensive driers and/or solvent recovery systems.

While the method herein described constitutes a preferred embodiment of the invention, it is to be understood that the invention is not limited to this precise method, and that changes may be made therein without departing from the scope of the invention which is defined in the appended claims.

I claim:

1. A hot melt chromogenic coating composition having a melting point of from about 60° C. to about 140° comprising a chromogenic material and a solid alkane dioic acid, said chromogenic material being a color developer of the acidic electron acceptor type, said alkane dioic acid being a water soluble dicarboxylic acid having a carbon chain of at least 5 carbon atoms.

2. The coating composition of claim 1 wherein said coating composition contains from about 0.1% to about 50%, by weight, of said color developer.

3. The coating composition of claim 1 wherein said alkane dioic acid is selected from the group consisting of azelaic, glutaric, pimelic, suberic, adipic and sebacic acids and mixtures thereof.

4. The coating composition of claim 1 wherein said solid alkane dioic acid includes azelaic acid.

* * * * *